United States Patent [19]
Kaiser

[11] Patent Number: 5,910,717
[45] Date of Patent: Jun. 8, 1999

[54] CIRCUIT ARRANGEMENT FOR CONTROLLING A REVERSIBLE D.C. MOTOR

[75] Inventor: Uwe Kaiser, Asslar-Bechlingen, Germany

[73] Assignee: U.S. Philips Corporation, New York, N.Y.

[21] Appl. No.: 08/854,713

[22] Filed: May 12, 1997

[30] Foreign Application Priority Data

Aug. 1, 1996 [DE] Germany .......................... 196 31 043

[51] Int. Cl.$^6$ ...................................................... H02P 1/00
[52] U.S. Cl. .......................................... 318/283; 318/293
[58] Field of Search ................................ 318/138, 245, 318/254–293, 439; 388/800–832; 360/72–89

[56] References Cited

U.S. PATENT DOCUMENTS

| | | | |
|---|---|---|---|
| 4,527,103 | 7/1985 | Kade ........................................ | 318/293 |
| 4,651,269 | 3/1987 | Matsummura ........................... | 318/599 |
| 5,523,848 | 6/1996 | Musso et al. ............................ | 358/296 |
| 5,552,683 | 9/1996 | Dargent .................................... | 318/287 |
| 5,596,253 | 1/1997 | Mitzuta et al. .......................... | 318/469 |
| 5,642,247 | 6/1997 | Giordano ................................. | 318/434 |
| 5,744,922 | 4/1998 | Neary et al. ............................. | 318/293 |

OTHER PUBLICATIONS

"Elektrische Kleinmotoren", Helmut Mugschalla, Expert–Verlag, Figure 8.15, pp. 182–183.

*Primary Examiner*—Paul Ip
*Attorney, Agent, or Firm*—Steven S. Rubin

[57] ABSTRACT

A circuit arrangement for controlling the operation of a d.c. motor. The circuit includes a controller having a reference potential input and a control input. The control input is used for controlling the speed of the motor. A plurality of switches allows the circuit arrangement to enable the controller to control the motor when the motor is to operate in one direction. The plurality of switches further causes the controller to be unable to control the motor when the motor is to be operated in a second direction. This arrangement improves speed control accuracy.

15 Claims, 1 Drawing Sheet

CIRCUIT ARRANGEMENT FOR CONTROLLING A REVERSIBLE D.C. MOTOR

BACKGROUND OF THE INVENTION

1. Field of the Invention

The invention relates to a circuit arrangement for controlling a d.c. motor which can be driven in two directions, which arrangement comprises control means having a reference potential input and a control input, by means of which the speed of the motor is controllable.

2. Description of the Related Art

Such a circuit arrangement is known, for example, from the cassette deck Alpine type GR-H.

In this known cassette deck the capstan motor is operated in two directions of rotation, one direction of rotation serving for the tape transport of the magnetic tape and the other direction being used for servo functions. The control means are realized, for example, by means of a three-point controller, which is available from, for example, Matsushita as the integrated circuit AN6605-N. For the direction reversal an H-bridge is used, for example as revealed in the book "Elektrische Kleinmotoren", Helmut Mugschalla, Expert-Verlag, FIG. 8.15. In this known bridge circuit a transistor is disposed between the motor and the supply voltage and a transistor is disposed between the motor and the control input of the control means in both directions of rotation of the motor. This has the disadvantage that, for example in the case of bipolar transistors the collector-emitter voltages of the conducting transistors influence the motor voltage and hence the speed, because these collector-emitter voltages cannot be measured and corrected by the control means. These collector-emitter voltages are dependent both on the collector current and on the temperature. A further disadvantage of this known bridge circuit is that the base current of the transistor arranged between the motor and the control input of the control means flows into the control input of the control means but does not flow through the motor. As a result of this, fluctuations of the base current of this transistor influence the control means without the current through the motor having changed.

SUMMARY OF THE INVENTION

It is an object of the invention to provide a circuit arrangement of the type defined in the opening paragraph, by means of which a more accurate speed control is possible.

According to the invention this object is achieved in that there have been provided switching means by means of which the control means for the speed control of the motor can be rendered operative for a first direction of rotation of the motor and by means of which the control means can be rendered inoperative for a second direction of rotation of the motor.

In the first direction of rotation the motor is controlled by the control means and in the other direction of rotation these control means are disabled and the motor is operated in a non-controlled mode or in another control mode. This enables the circuit arrangement to be optimized for controlling the first direction of rotation, a very accurate speed control being possible for the first direction of rotation. In the second direction of rotation the motor can be operated either in a non-controlled mode or use can be made of other control circuits, particularly circuits which are simpler than the control means for the speed control in the first direction of rotation.

An advantageous embodiment of the invention is characterized in that the switching means comprise a first, a second, a third and a fourth transistor, a first electrical terminal of the motor is coupled to a supply voltage by means of the first transistor and to the reference potential input of the control means by means of the second transistor and a second electrical terminal of the motor is coupled to a control input of the control means for operation in the first direction, and the first electrical terminal is coupled to a further reference potential by means of the third transistor and the second electrical terminal to the supply voltage by means of the fourth transistor for operation in the second direction.

During operation of the motor in the first direction the supply voltage is applied to the first electrical terminal of the motor by means of the first transistor. At the same time, the first terminal of the motor is coupled to the reference potential input of the control means by a second transistor. During operation in the first direction the first and the second transistor are conductive the third and the fourth transistor are cut off, as a result of which voltage is applied to the reference potential input of the control means and the first electrical terminal of the motor. Only the conductive second transistor is disposed between the first electrical terminal of the motor and the reference potential input of the control means, the current flowing through this transistor being not the motor current but a current which is smaller than the motor current. Consequently, the collector-emitter voltage produced across the second transistor during operation of the motor in the first direction is also comparatively low.

On the other hand, the second electrical terminal of the motor is coupled to the control input of the control means during operation of the motor in the first direction. No transistor is required between the control input of the control means and the second electrical terminal of the motor, as a result of which the same current flows through the motor and the control input of the control means. There are no transistor base currents which flow into the control input of the control means and not through the motor.

For operation of the motor in the second direction the first electrical terminal of the motor is coupled to a reference potential by means of a third transistor and the second electrical terminal of the motor is coupled to the supply potential by means of a fourth transistor. In the second direction, the third and the fourth transistor are conductive and the first and the second transistor are cut off. The voltage supply to the motor is now reversed, as a result of which the motor rotates in the second direction. In this second direction of the motor the control means is inoperative, as a result of which the motor operates in a non-controlled mode in this second direction. The speed of the motor in the second direction can be adjusted by means of the third transistor. As it is not necessary to have a highly constant speed for the servo functions in a magnetic-tape-cassette apparatus, a very simple circuit can be used for this purpose. For many uses it suffices to have a constant voltage across the motor.

In a further advantageous embodiment of the invention the second electrical terminal is connected to the control input of the control means.

In an advantageous embodiment of the invention there has been provided a fifth transistor which, on the one hand, is coupled to a further reference potential input of the control means and to the second transistor and, on the other hand, to the further reference potential.

In the second direction of the motor the supply voltage is applied to the second electrical terminal of the motor. Since the second electrical terminal of the motor is coupled to the control input of the control means, the control input of the control means is also at the supply potential in the second direction of the motor. To ensure a well-defined turn-off of the control means for the second direction of the motor and to preclude undesired functions of the control means in the second direction of the motor, it is necessary that both the reference potential input of the control means and the further reference potential input of the control means are switched to a "high-impedance" state. This is required particularly in the case that the control means take the form of an integrated circuit. This is achieved by means of a fifth transistor. In the second direction of the motor the fifth transistor is cut off, as a result of which the further reference potential input of the control means is switched to the high-impedance state. In the second direction of the motor the third and the fourth transistor are conductive. As a result of this, the potential on the first electrical terminal of the motor decreases, causing the second transistor, which is coupled to the first electrical terminal of the motor, to be turned off automatically. As a consequence, the reference potential input of the control means is also switched to the high-impedance state in the second direction of the motor and the control means become inoperative. In the first motor direction the first and the fifth transistor are turned on and, as a result, the second transistor is also turned on automatically. The further reference potential input of the control means is at the further reference potential in the first motor direction.

A further advantageous embodiment of the invention is characterized in that the control means and the second transistor are integrated in the motor.

Since the internal resistance and the magnetic flux of the motor vary with the temperature, it is advantageous to incorporate the control means also in the motor and to compensate the motor characteristic accordingly for temperature. If the second transistor is now also arranged in the motor, the motor requires only three connections for external voltage supply and control. The first connection is required for the first electrical terminal of the motor, the second connection for the second electrical terminal of the motor, and the third connection for the fifth transistor.

In a further advantageous embodiment of the invention the first, the third, the fourth and the fifth transistor are integrated in an integrated circuit.

The circuit arrangement in accordance with the invention is particularly suitable for construction as an integrated circuit because, for example, in the case of bipolar transistors the collector-emitter voltages and the base currents of the first, the third, the fourth and the fifth transistor have no influence on the motor voltage and, consequently, on the speed control. As a result, the speed control is not influenced by the fact that in integrated circuits it is not possible, as a rule, to operate transistors in the saturation region and, consequently, the collector-emitter voltages are distinctly higher than in the case of separate transistors. Moreover, integrated transistors have substantially lower gain factors, as a result of which the base currents become substantially larger, but in the circuit arrangement in accordance with the invention this has neither any influence on the speed control. Since the second transistor is integrated in the motor as a separate transistor, it can be operated in the saturation region and fluctuations of the collector-emitter voltage of this second transistor have hardly any influence on the speed control.

Preferably, the circuit arrangement in accordance with the invention is used in a tape deck or in a magnetic-tape-cassette apparatus. It is particularly advantageous if the circuit arrangement in accordance with the invention is used for driving a capstan motor which serves for the transport of the magnetic tape in one direction of rotation and which is used for servo functions in the other direction of rotation. Such a use generally requires only a very accurate speed control for the tape transport, a highly accurate speed control not being necessary for the servo functions.

BRIEF DESCRIPTION OF THE DRAWINGS

An embodiment of the invention will now be described in more detail, by way of example, with reference to FIGS. 1 and 2 of the drawing. In the drawing.

DETAILED DESCRIPTION OF THE PREFERRED EMBODIMENTS

Figure 1:
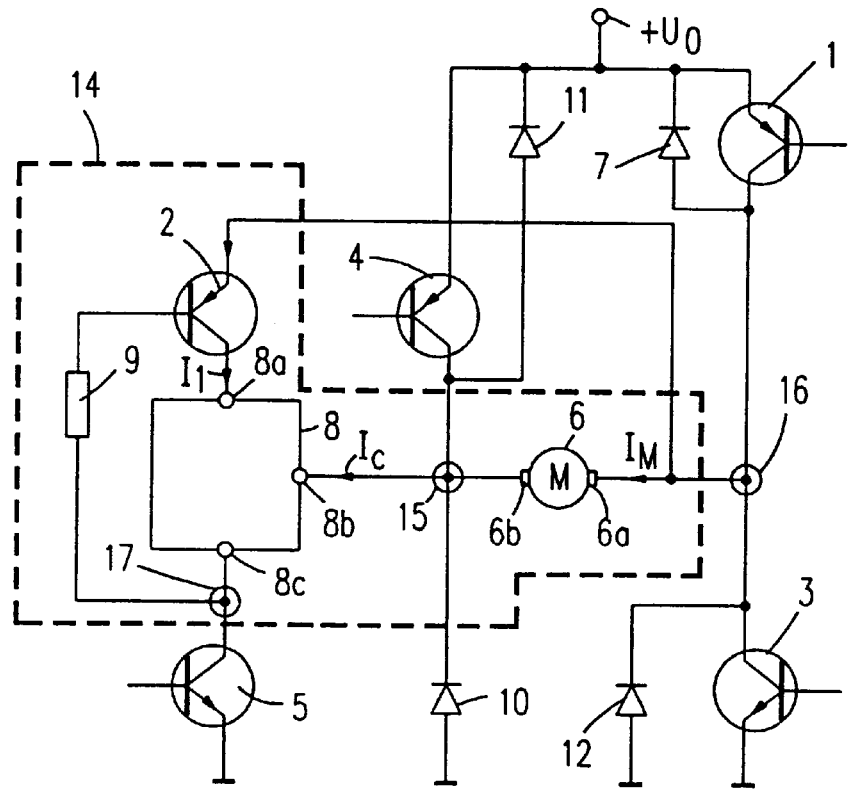
FIG. 1 is a block diagram of a circuit arrangement for controlling a reversible d.c. motor, comprising control means and five transistors.

FIG. 1 shows a circuit arrangement for controlling a d.c. motor 6 which can be driven in two directions. The d.c. motor 6 has a first electrical terminal formed by a first supply voltage terminal 6a and a second electrical terminal formed by a second supply voltage terminal 6b. The first supply voltage terminal 6a is coupled to the collector of a first transistor 1 whose emitter is coupled to a positive supply voltage $+U_0$. The collector of the transistor 1 and the emitter of the transistor 1 are coupled by means of a freewheel diode 7. The first supply voltage terminal 6a of the motor 6 is coupled to the emitter of a second transistor 2 whose collector is coupled to a reference potential input 8a of a control means 8. The base of the transistor 2 is coupled to the collector of a fifth transistor 5 by means of a resistor 9, which fifth transistor has its emitter coupled to a further reference potential. The collector of the fifth transistor 5 is coupled to a further reference potential input 8c of the control means 8. The second supply voltage terminal 6b of the motor 6 is coupled to a control input 8b of the control means 8 and to the further reference potential by means of a freewheel diode 10. Furthermore, the second supply voltage terminal 6b of the motor 6 is coupled to the collector of a fourth transistor 4, whose emitter is coupled to the positive supply voltage $+U_0$. The collector and the emitter of the transistor 4 are coupled by means of a freewheel diode 11. The first supply voltage terminal 6a of the motor 6 is coupled to the collector of a third transistor 3, whose emitter is coupled to the further reference potential. The collector of the third transistor 3 is coupled to the further reference potential by means of a freewheel diode 12. The bases of the first transistor 1, of the third transistor 3, of the fourth transistor 4 and of the fifth transistor 5 can be driven by drive means, not shown.

By means of the circuit arrangement in accordance with the invention the motor 6 can be driven in a first direction in a controlled mode and in a second direction in a non-controlled mode. For the first controlled direction the first transistor 1 and the fifth transistor 5 are turned on by control means, not shown. As a result of this, the second transistor 2 is also turned on automatically and the reference potential input 8a is coupled to the supply voltage $+U_0$ by means of the conductive second transistor 2 and by means of the conductive first transistor 1. The third transistor 3 and the fourth transistor 4 are turned off by control means, not shown, which drive the bases of the transistors 3 and 4 for the first direction of rotation of the motor. The first supply voltage terminal 6a of the motor 6 receives the supply voltage +U$_0$ by means of the conductive first transistor 1 in the first direction of the motor. The influence of the first transistor 1 and of the fifth transistor 5 on the speed control during operation of the motor in the first direction is zero. The only transistor which has an influence on the speed control is the second transistor 2. However, since a very small collector current I$_1$ flows through the second transistor 2, which current is distinctly smaller than the motor current I$_M$ which flows through the motor, the collector-emitter voltage of the second transistor 2 is only very small. Thus, if the very small collector-emitter voltage of the second transistor 2 is ignored, the first supply voltage terminal 6a and the reference potential input 8a of the control means 8 are then at the same potential.

Moreover, during operation of the motor 6 in the first direction there are no base currents which flow into the control input 8b of the control means 8 but which do not flow through the motor 6. As a matter of fact, exactly the same current flows through the motor 6 and the control input 8b of the control means 8 in the first direction of the motor.

In the second direction of rotation the motor 6 is operated in a non-controlled mode, i.e. the control means 8 are disabled. In the second direction of rotation, which is preferably used for servo functions of a cassette deck, the third transistor 3 and the fourth transistor 4 are turned on and the first transistor 1 and the fifth transistor 5 are turned off. As the third transistor 3 is cut off, the potential on the first supply voltage terminal 6a of the motor 6 and, consequently, that on the emitter of the second transistor 2 decreases, as a result of which the second transistor is cut off and the reference potential input 8a of the control means 8 is switched to a high-impedance state. The motor 6 is now energized in the opposite direction, i.e. the second supply voltage terminal 6b receives the supply voltage +U$_0$ via the conductive fourth transistor 4, the first supply voltage terminal 6a being coupled to the further reference potential via the conductive third transistor 3. Thus, during operation of the motor 6 in the second direction the control input 8b of the control means 8 is also connected to the further reference potential U$_0$ via the conductive fourth transistor 4. To ensure a well-defined turn-off of the control means 8 and to preclude undesired functions of the control means 8 in the second direction of the motor, the fifth transistor 5 is turned off, as result of which the further reference potential input 8c of the control means 8 is switched to a high-impedance state. As a result, the control means 8 is disabled and it is avoided that the supply voltage U$_0$ applied to the control input 8b of the control means 8 is connected to a further reference potential input 8c coupled to the further reference potential. This precludes undesirable effects.

Since the internal resistance and the magnetic flux of the motor vary with the temperature, the control means 8 is preferably incorporated in the housing of the motor 6 and the motor characteristic is temperature-compensated accordingly. The second transistor 2 is preferably also arranged in the housing of the motor 6. This is indicated by the dashed line in FIG. 1. This has the advantage that the motor requires only three terminals 15, 16 and 17 for external wiring. This is very favourable in view of production engineering, because each these terminals requires one or even two manual solder joints. The other circuit elements, i.e. the first transistor 1, the third transistor 3, the fourth transistor 4 and the fifth transistor 5 with the associated freewheel diodes 10, 11 and 12 can be integrated advantageously in an integrated circuit.

Fluctuations of the collector-emitter voltages of the first transistor 1, the third transistor 3, the fourth transistor 4 and the fifth transistor 5 have no influence on the motor voltage and hence on the speed control. Consequently, the control characteristics of the circuit arrangement in accordance with the invention do not change as a result of the above-mentioned integration, although in integrated circuits it is not possible, as a rule, to operate the transistors in the saturation region and, consequently, the collector-emitter voltages are distinctly higher than in the case of separate transistors.

Since the base currents of the transistors 1 to 5 have no influence on the control process, the fact that integrated transistors have distinctly lower gain factors, causing their base currents to become substantially larger, does not have any adverse effect in the circuit arrangement in accordance with the invention. The second transistor 2 integrated in the motor housing as a separate transistor can be operated in the saturation region, as a result of which the collector-emitter voltage of this second transistor 2 has hardly any influence on the speed control.

A further favourable property of the circuit arrangement shown in FIG. 1 results from the fact that the freewheel diode 10 automatically also protects the control means 8 and, consequently, no additional freewheel diode is required for the protection of the control means 8.

Moreover, it is advantageous that the supply voltage for the control means 8 is switched off automatically when the supply voltage +U$_0$ is turned off.

Figure 2:
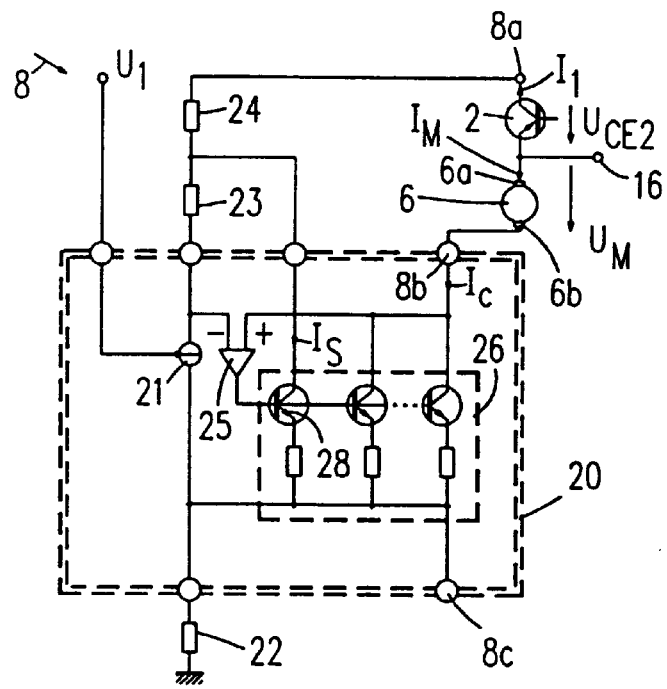
FIG. 2 is a block diagram of the control means shown in FIG. 1.

FIG. 2 is a basic block diagram of the control means 8 shown in FIG. 1. In the same way as in FIG. 1, the control means 8 have a reference potential input 8a, a control input 8b and a further reference potential input 8c. Between the reference potential input 8a and the control input 8b only the circuitry of FIG. 1 with the transistor 2 and the motor 6 is shown, the other elements of FIG. 1 not being shown for the sake of clarity. The control means 8 comprises an integrated circuit 20 including a constant-current source 21, which is energized with a potential U$_1$. As a rule, the potential U$_1$ will be equal to the potential U$_0$ in FIG. 1, but this is not strictly necessary. The constant-current source 21 has one end coupled to the further reference potential via a resistor 22 and has its other end coupled to the reference potential input 8a via the series arrangement of a resistor 23 and a resistor 24. An operational amplifier 25 has its inverting input coupled to the current source 21 and the resistor 23 and its non-inverting input to the control input 8b. Moreover, a current mirror circuit 26 is coupled to the control input 8b, to the output of the operational amplifier 25 and to the further reference potential input 8c. The current mirror circuit 26 is also coupled to the resistor 24 and the resistor 23.

The current mirror circuit 26 serves as a current sensor and comprises a parallel arrangement of a plurality of transistors, not shown. The currents of the individual transistors of the current mirror circuit 26 correspond very accurately. Thus, a transistor 28 of the current mirror circuit 26 can be used as sensor or mirror, and the mirror current I$_S$ flowing through the transistor 28 represents a highly accurate fraction of the motor current I$_M$, which is identical to the current I$_C$ which flows into the integrated circuit 20 via the control input 8b. If the motor 6 should deliver a higher torque as a result of a higher load, the motor current I$_M$ and, consequently, the mirror current I$_S$ increase, which causes the voltage drop across the resistor 24 to increase and the potential on the inverting input of the operational amplifier 25 to decrease. As a result, the operational amplifier drives the transistors of the current mirror circuit 26 further into conduction, so that the potential on the control input 8b decreases, the motor voltage $U_M$ across the motor consequently increases, and the induced motor voltage, which is proportional to the speed, remains constant. Thus, the speed is also maintained constant in the case of load variations. If the voltage on the reference potential input 8a changes, this has neither any influence on the motor speed because voltage variations on the reference potential input 8a are fed back to the control input 8b by means of the operational amplifier 25, as a result of which the voltage difference between the reference potential input 8a and the control input 8b is not affected by voltage fluctuations on the reference potential input 8a.

The control accuracy of the control means 8 is dictated by two factors:

1. The motor current $I_M$ which flows through the motor should be exactly equal to the current $I_C$ which flows into the control input 8b. This is guaranteed by means of the circuit arrangement in accordance with the invention.
2. The potential on the first supply voltage terminal 6a of the motor 6 should be equal, to the highest possible degree, to the potential on the reference potential input 8a of the control means 8. In the circuit arrangement in accordance with the invention only the transistor 2 is disposed between the first supply voltage terminal 6a of the motor 6 and the reference potential input 8a. However, the collector-emitter voltage $U_{CE2}$ of this transistor is very low during operation of the motor in the first direction, which has two reasons. On the one hand, the collector current $I_1$ which flows through the transistor 2 and into the reference potential input 8a is very small in comparison with the motor current $I_M$ and, moreover, it is more constant than the motor current $I_M$. As a result, the voltage $U_{CE2}$ of the transistor 2 produced by the collector current $I_1$ is very low and very constant. In addition to this, the transistor 2 in the circuit arrangement in accordance with the invention is preferably formed by a separate transistor, as a result of which the transistor 2 can be operated in the saturation region and also a smaller voltage drop $U_{CE2}$ is guaranteed.

The circuit arrangement in accordance with the invention provides a possibility of driving a reversible d.c. motor in a suitable manner in both directions, the motor being controlled ny control means in one direction, these control means being disabled in the other direction and the motor not being controlled or being controlled in another manner. Thus, it is achieved that in the first controlled direction fluctuations of the collector-emitter voltages or drain-source voltages of the transistors of this circuit arrangement in accordance with the invention and fluctuations of the base currents or gate currents have no influence on the speed control in this first controlled direction and the control accuracy is increased considerably in comparison with that of a conventional H-bridge. This can be used particularly advantageously for controlling the capstan motor of a magnetic-tape-cassette apparatus because in many applications it can be used in one direction for the tape drive of the magnetic tape and in the other direction for servo functions. For the tape drive a highly accurate speed control is required, whereas servo functions not a highly accurate or only a very simple control is needed.

I claim:

1. A circuit arrangement for controlling a d.c. motor which can be driven in two directions, said arrangement comprising:

a controller having a reference potential input and a control input, said controller controlling the speed control of the motor; and a plurality of switches;

wherein, through selective operation of said switches, the controller can be rendered operative for a first direction of rotation of the motor and the controller can be rendered inoperative for a second direction of rotation of the motor.

2. A circuit arrangement as claimed in claim 1, wherein said plurality of switches comprises a first, a second, a third and a fourth transistor, and wherein:

a first electrical terminal of the motor is coupled to a supply voltage through the first transistor and to the reference potential input of the controller through the second transistor:

a second electrical terminal of the motor is coupled to a control input of the controller for operation in the first direction;

the first electrical terminal is coupled to a further reference potential through the third transistor: and the second electrical terminal is coupled to the supply voltage through the fourth transistor for operation in the second direction.

3. A circuit arrangement as claimed in claim 2, further comprising a fifth transistor coupled to a further reference potential input of the controller, said fifth transistor further being coupled to the second transistor and, the further reference potential.

4. A circuit arrangement as claimed in claim 3, wherein the first, the third, the fourth and the fifth transistor are integrated in an integrated circuit.

5. A circuit arrangement as claimed in claim 2, wherein the controller and the second transistor are integrated in a housing of the motor.

6. A circuit arrangement as claimed in claim 2, wherein the first, the third, the fourth and the fifth transistor are integrated in an integrated circuit.

7. A circuit arrangement as claimed in claim 2, wherein the second electrical terminal is connected to the control input of the controller.

8. A circuit arrangement as claimed in claim 1, wherein the second electrical terminal is connected to the control input of the controller.

9. A circuit arrangement as claimed in claim 8, wherein the controller and the second transistor are integrated in a housing of the motor.

10. A circuit arrangement as claimed in claim 8, wherein the first, the third, the fourth and the fifth transistor are integrated in an integrated circuit.

11. A tape deck including a circuit arrangement for controlling a d.c. motor, said circuit arrangement comprising:

a controller having a reference potential input and a control input, said controller controlling the speed control of the motor; and a plurality of switches;

wherein, through selective operation of said switches, the controller can be rendered operative for a first direction of rotation of the motor and the controller can be rendered inoperative for a second direction of rotation of the motor.

12. A magnetic-tape-cassette apparatus including a circuit arrangement for controlling a d.c. motor, said circuit arrangement comprising:

a controller having a reference potential input and a control input, said controller controlling the speed control of the motor; and a plurality of switches;

wherein, through selective operation of said switches, the controller can be rendered operative for a first direction of rotation of the motor and the controller can be rendered inoperative for a second direction of rotation of the motor.

13. A tape deck including a circuit arrangement for controlling a d.c. motor said circuit arrangement comprising:

a controller having a reference potential input and a control input, said controller controlling the speed control of the motor; and a plurality of switches; said plurality of switches including a first, a second, a third and a fourth transistor;

a first electrical terminal of the motor coupled to a supply voltage through the first transistor and to the reference potential input of the controller through the second transistor:

a second electrical terminal of the motor coupled to a control input of the controller for operation in the first direction;

the first electrical terminal coupled to a further reference potential through the third transistor;

the second electrical terminal coupled to the supply voltage through the fourth transistor for operation in the second direction;

a fifth transistor coupled to a further reference potential input of the controller, said fifth transistor being further coupled to the second transistor and the further reference potential;

wherein, through selective operation of said switches, the controller can be rendered operative for a first direction of rotation of the motor and the controller can be rendered inoperative for a second direction of rotation of the motor.

14. A magnetic-tape-cassette apparatus including a circuit arrangement for controlling a d.c. motor said circuit arrangement comprising:

a controller having a reference potential input and a control input, said controller controlling the speed control of the motor; and a plurality of switches; said plurality of switches including a first, a second, a third and a fourth transistor;

a first electrical terminal of the motor coupled to a supply voltage through the first transistor and to the reference potential input of the controller through the second transistor:

a second electrical terminal of the motor coupled to a control input of the controller for operation in the first direction;

the first electrical terminal coupled to a further reference potential through the third transistor;

the second electrical terminal coupled to the supply voltage through the fourth transistor for operation in the second direction;

a fifth transistor coupled to a further reference potential input of the controller, said fifth transistor being further coupled to the second transistor and the further reference potential;

wherein, through selective operation of said switches, the controller can be rendered operative for a first direction of rotation of the motor and the controller can be rendered inoperative for a second direction of rotation of the motor.

15. A method of controlling the operation of a motor, said method comprising:

providing a motor;

providing a plurality of switches;

providing a controller;

coupling said controller to said motor through said switches;

when said motor is to be operated in a first direction, actuating a first set of said plurality of switches thereby placing said motor under the control of said controller; and when said motor is to be operated in a second direction, actuating a second set of said plurality of switches thereby causing said motor to be free from control of said controller.

* * * * *